(12) United States Patent
Austin et al.

(10) Patent No.: US 10,056,114 B2
(45) Date of Patent: *Aug. 21, 2018

(54) SMALL-SCREEN MOVIE-WATCHING USING A VIEWPORT

(71) Applicant: Google Inc., Mountain View, CA (US)

(72) Inventors: Darren Mark Austin, San Jose, CA (US); Baback Elmieh, Palo Alto, CA (US); Douglas Paul Sweetland, Los Angeles, CA (US); Brian M. Collins, South San Francisco, CA (US); Mark Jason Oftedal, Naperville, IL (US); Jan J. Pinkava, Portland, OR (US)

(73) Assignee: Colby Nipper, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,931

(22) Filed: Mar. 4, 2017

(65) Prior Publication Data

US 2017/0178690 A1    Jun. 22, 2017

Related U.S. Application Data

(62) Division of application No. 14/335,821, filed on Jul. 18, 2014, now Pat. No. 9,589,597.

(Continued)

(51) Int. Cl.
*H04N 5/775* (2006.01)
*G11B 27/30* (2006.01)
(Continued)

(52) U.S. Cl.
CPC ......... *G11B 27/30* (2013.01); *G06K 9/00201* (2013.01); *G06K 9/00221* (2013.01);
(Continued)

(58) Field of Classification Search
CPC .................................. H04N 21/4314
See application file for complete search history.

(56) References Cited

U.S. PATENT DOCUMENTS

| | | | |
|---|---|---|---|
| 5,607,356 | A | 3/1997 | Schwartz |
| 5,892,507 | A | 4/1999 | Moorby et al. |
| | | (Continued) | |

FOREIGN PATENT DOCUMENTS

| | | |
|---|---|---|
| EP | 1087618 | 3/2001 |
| EP | 2209306 | 7/2010 |
| WO | WO-2006056311 | 6/2006 |

OTHER PUBLICATIONS

"Final Office Action", U.S. Appl. No. 14/209,432, dated Jun. 16, 2017, 23 pages.

(Continued)

*Primary Examiner* — Thai Tran
*Assistant Examiner* — Girumsew Wendmagegn
(74) *Attorney, Agent, or Firm* — Google LLC

(57) ABSTRACT

This document describes techniques and apparatuses for small-screen movie-watching using a viewport. These techniques enable viewers to experience movies and other media programs using a small screen as a viewport to the movie rather than dramatically compressing or cropping the movie to fit the small screen. A viewer may select whatever portion of the movie imagery he or she desires to experience through the small screen at a size sufficient to perceive details of plot elements and an environment in which the plot elements interact. Thus, the viewer may follow plot elements central to the plot while also exploring the environment that provides context for these plot elements.

20 Claims, 9 Drawing Sheets

Related U.S. Application Data

(60) Provisional application No. 61/856,444, filed on Jul. 19, 2013.

(51) Int. Cl.

| | | |
|---|---|---|
| *G11B 27/00* | (2006.01) | |
| *G11B 27/10* | (2006.01) | |
| *H04N 21/234* | (2011.01) | |
| *H04N 21/433* | (2011.01) | |
| *H04N 21/4725* | (2011.01) | |
| *H04N 21/4728* | (2011.01) | |
| *H04N 21/858* | (2011.01) | |
| *H04N 21/431* | (2011.01) | |
| *H04N 21/4402* | (2011.01) | |
| *H04N 21/472* | (2011.01) | |
| *H04N 21/8545* | (2011.01) | |
| *G06K 9/00* | (2006.01) | |

(52) U.S. Cl.
CPC .......... *G11B 27/007* (2013.01); *G11B 27/102* (2013.01); *H04N 21/23412* (2013.01); *H04N 21/4314* (2013.01); *H04N 21/4333* (2013.01); *H04N 21/440245* (2013.01); *H04N 21/4725* (2013.01); *H04N 21/4728* (2013.01); *H04N 21/47205* (2013.01); *H04N 21/8545* (2013.01); *H04N 21/8583* (2013.01); *G06F 2200/1637* (2013.01)

(56) References Cited

U.S. PATENT DOCUMENTS

| | | |
|---|---|---|
| 6,621,504 B1 | 9/2003 | Nadas et al. |
| 6,714,909 B1 | 3/2004 | Gibbon et al. |
| 7,184,574 B1 | 2/2007 | Zahavi |
| 7,467,218 B2 | 12/2008 | Gould et al. |
| 7,860,309 B1 | 12/2010 | Bodnar et al. |
| 7,904,812 B2 | 3/2011 | Atlas et al. |
| 9,086,724 B2 | 7/2015 | Sakaguchi et al. |
| 9,087,403 B2 | 7/2015 | Keating et al. |
| 9,183,560 B2 | 11/2015 | Abelow |
| 9,589,597 B2 * | 3/2017 | Austin ............... H04N 21/4314 |
| 9,607,424 B2 | 3/2017 | Ng et al. |
| 9,766,786 B2 | 9/2017 | Elmieh et al. |
| 9,779,480 B2 | 10/2017 | Austin et al. |
| 9,851,868 B2 | 12/2017 | Elmieh |
| 9,933,921 B2 | 4/2018 | Elmieh et al. |
| 2003/0145331 A1 | 7/2003 | Escobar et al. |
| 2003/0232318 A1 | 12/2003 | Altenhofen et al. |
| 2004/0021668 A1 | 2/2004 | Chevallier et al. |
| 2004/0218911 A1 | 11/2004 | Grimes |
| 2005/0025465 A1 | 2/2005 | Danieli |
| 2006/0256133 A1 | 11/2006 | Rosenberg |
| 2007/0028270 A1 | 2/2007 | Ostojic et al. |
| 2007/0061862 A1 | 3/2007 | Berger et al. |
| 2008/0005669 A1 | 1/2008 | Eilertsen et al. |
| 2008/0034321 A1 | 2/2008 | Griffin |
| 2008/0215172 A1 | 9/2008 | Digon |
| 2008/0267451 A1 | 10/2008 | Karazi |
| 2009/0113278 A1 | 4/2009 | Denoue et al. |
| 2009/0181736 A1 | 7/2009 | Haigh-Hutchinson et al. |
| 2009/0198719 A1 | 8/2009 | DeWitt |
| 2009/0199090 A1 | 8/2009 | Poston et al. |
| 2009/0201313 A1 | 8/2009 | Thorn |
| 2009/0219411 A1 | 9/2009 | Marman et al. |
| 2009/0249404 A1 | 10/2009 | Chen |
| 2009/0325660 A1 | 12/2009 | Langridge |
| 2010/0115455 A1 | 5/2010 | Kim |
| 2000/0153520 | 6/2010 | Daun et al. |
| 2000/0157064 | 6/2010 | Cheng et al. |
| 2000/0174421 | 7/2010 | Tsai et al. |
| 2000/0208138 | 8/2010 | Mohri et al. |
| 2000/0251101 | 9/2010 | Haussecker et al. |
| 2011/0126106 A1 | 5/2011 | Ben et al. |
| 2011/0299832 A1 | 12/2011 | Butcher |
| 2011/0304627 A1 | 12/2011 | Kegel |
| 2012/0092348 A1 | 4/2012 | McCutchen |
| 2012/0105473 A1 | 5/2012 | Bar-Zeev et al. |
| 2012/0169882 A1 | 7/2012 | Millar et al. |
| 2012/0249424 A1 | 10/2012 | Bove et al. |
| 2013/0073473 A1 | 3/2013 | Heath |
| 2014/0002580 A1 | 1/2014 | Bear et al. |
| 2014/0133834 A1 | 5/2014 | Shannon |
| 2014/0282013 A1 | 9/2014 | Amijee |
| 2015/0012827 A1 | 1/2015 | Elmeih |
| 2015/0022557 A1 | 1/2015 | Austin et al. |
| 2015/0023650 A1 | 1/2015 | Austin et al. |
| 2015/0026576 A1 | 1/2015 | Elmieh et al. |
| 2015/0042795 A1 | 2/2015 | Tsuria et al. |
| 2015/0378520 A1 | 12/2015 | Chandrasekaran |
| 2016/0026344 A1 | 1/2016 | Elmieh |
| 2016/0054863 A1 | 2/2016 | Elmieh et al. |

OTHER PUBLICATIONS

"Notice of Allowance", U.S. Appl. No. 14/335,833, dated May 24, 2017, 8 pages.

"Corrected Notice of Allowance", U.S. Appl. No. 14/335,821, dated Jan. 12, 2017, 2 pages.

"Final Office Action", U.S. Appl. No. 14/209,432, dated Jul. 7, 2016, 18 pages.

"Final Office Action", U.S. Appl. No. 14/333,387, dated Feb. 27, 2017, 16 pages.

"International Preliminary Report on Patentability", Application No. PCT/US2014/046907, dated Jan. 19, 2016, 8 pages.

"International Preliminary Report on Patentability", Application No. PCT/US2014/047302, dated Jan. 19, 2016, 8 pages.

"International Preliminary Report on Patentability", Application No. PCT/US2014/047269, dated Jan. 19, 2016, 9 pages.

"International Search Report and Written Opinion", Application No. PCT/US2014/046907, dated Nov. 6, 2014, 11 Pages.

"International Search Report and Written Opinion", Application No. PCT/US2014/047302, dated Jan. 22, 2015, 13 Pages.

"International Search Report and Written Opinion", Application No. PCT/US2015/041339, dated Oct. 30, 2015, 13 pages.

"International Search Report and Written Opinion", Application No. PCT/US2014/047269, dated Nov. 10, 2014, 13 pages.

"Non-Final Office Action", U.S. Appl. No. 14/209,432, dated Mar. 10, 2016, 21 pages.

"Non-Final Office Action", U.S. Appl. No. 14/209,432, dated Dec. 7, 2016, 22 pages.

"Non-Final Office Action", U.S. Appl. No. 14/333,387, dated Jul. 28, 2016, 18 pages.

"Non-Final Office Action", U.S. Appl. No. 14/335,821, dated Feb. 25, 2016, 9 pages.

"Non-Final Office Action", U.S. Appl. No. 14/513,761, dated Oct. 4, 2016, 12 pages.

"Notice of Allowance", U.S. Appl. No. 14/35,821, dated Oct. 25, 2016, 5 pages.

"Pre-Interview Communication", U.S. Appl. No. 14/335,833, dated Dec. 29, 2016, 3 pages.

"Pre-Interview Communication", U.S. Appl. No. 14/526,311, dated Feb. 10, 2017, 7 pages.

"Restriction Requirement", U.S. Appl. No. 14/335,821, dated Nov. 4, 2015, 5 pages.

"SightLine: The Chair—Virtual Surreality", Retrieved from: http://sightlinevr.com/index.html on Nov. 30, 2015, 2 pages.

Heymann,"Representation, Coding and Interactive Rendering of High-Resolution Panoramic Images and Video Using MPEG-4", Panoramic Photogrammetry Workshop, Berlin, Germany, Feb. 28, 2005, 5 Pages.

Kwiatek,"360 degree Interactive Storytelling", University of Glasgow Retrieved from the Internet: URL:http://www.kwiatek.krakow.pl/publications/28128927_360storytelling_University_of_Glasgow_Karol_Kwiatek_PDF.pdf, Sep. 27, 2012, 80 Pages.

"Final Office Action", U.S. Appl. No. 14/513,761, dated May 3, 2017, 13 pages.

(56) References Cited

OTHER PUBLICATIONS

"First Action Interview Office Action", U.S. Appl. No. 14/335,833, dated Mar. 6, 2017, 3 pages.
"First Action Interview Office Action", U.S. Appl. No. 14/526,311, dated Mar. 9, 2017, 3 pages.
"Foreign Office Action", EP Application No. 14752459.9, dated Mar. 6, 2017, 8 pages.
"International Preliminary Report on Patentability", Application No. PCT/US2015/041339, dated Feb. 2, 2017, 10 pages.
"Notice of Allowance", U.S. Appl. No. 14/333,387, dated May 4, 2017, 9 pages.
"Advisory Action", U.S. Appl. No. 14/209,432, dated Sep. 8, 2017, 4 pages.
"Final Office Action", U.S. Appl. No. 14/526,311, dated Sep. 22, 2017, 12 pages.
"Notice of Allowance", U.S. Appl. No. 14/513,761, dated Aug. 28, 2017, 5 pages.
"Notice of Allowance", U.S. Appl. No. 14/209,432, dated Nov. 14, 2017, 9 pages.
"Foreign Office Action", EP Application No. 14805391.1, dated Dec. 19, 2017, 6 pages.
"Foreign Office Action", EP Application No. 14752459.9, dated Apr. 25, 2018, 6 pages.
"Foreign Office Action", European Application No. 14747480.3, dated May 22, 2018, 5 pages.

\* cited by examiner

SMALL-SCREEN MOVIE-WATCHING USING A VIEWPORT

PRIORITY APPLICATION

This application claims priority to U.S. Provisional Patent Application No. 61/856,444, entitled "Small-Screen Movie-Watching Using a Viewport" and filed on Jul. 19, 2013, and U.S. patent application Ser. No. 14/335,821, entitled "Small-Screen Movie-Watching Using a Viewport" and filed on Jul. 18, 2014, the disclosures of which are incorporated in their entirety by reference herein.

BACKGROUND

Unless otherwise indicated herein, material described in this background section is neither expressly nor impliedly admitted to be prior art to the present disclosure or the appended claims.

Movies, like many media programs, are created with a certain viewing size in mind. Movie directors carefully consider what to include in each scene based on an expectation that the movie will be shown on a very large screen. This large screen gives movie directors the luxury of showing substantial detail and substantial context—they can show a full cast of characters in a restaurant while also showing two character's facial expressions, all with sufficient detail and context to engage the moviegoer.

Recently, however, moviegoers have taken to watching movies on small screens. Conventional techniques for presenting movies on small screens fail to engage moviegoers either by failing to provide sufficient detail or sufficient context. This is because conventional techniques compress and/or crop movie scenes to fit these small screens.

BRIEF DESCRIPTION OF THE DRAWINGS

Techniques and apparatuses for small-screen movie-watching using a viewport are described with reference to the following drawings. The same numbers are used throughout the drawings to reference like features and components.

DETAILED DESCRIPTION

Overview

This document describes techniques and apparatuses for small-screen movie-watching using a viewport. These techniques enable viewers to experience movies and other media programs using a small screen as a viewport to the movie rather than dramatically compressing or cropping the movie to fit the small screen. Through this viewport, a viewer may select whatever portion of the movie he or she desires to experience at a size sufficient to provide details by which to follow plot elements central to the plot. Also with this viewport, the viewer may explore an environment that provides context for these plot elements. When the viewer is exploring an environment for the plot elements, the techniques may repeat or loop elements of the movie that are needed to follow the plot, thereby giving the viewer freedom to view the movie's context without having to pause or rewind the movie to follow the plot.

Assume, for example, that a viewer wishes to watch the block-buster movie The Godfather, which was released in 1972, on his or her tablet computing device. Conventional techniques compress the movie to fit the tablet's display. This compression makes it difficult for the viewer to appreciate facial expressions and other details central to the viewer's enjoyment and his or her ability to fully follow the plot.

The techniques described in this document, however, enable a viewer to enjoy the movie in sufficient detail while also enabling the viewer to smoothly and seamlessly engage with the environment for elements central to the plot. For The Godfather, the techniques select a size at which sufficient detail can be shown through the viewer's tablet while also enabling the viewer to see the environment by orienting the viewport on the tablet. Thus, the viewer can view Michael Corleone sitting in the family Italian restaurant along with the corrupt Police Chief or the surrounding environment, including the bar, bartender, pictures on the walls, and other patrons. On returning to view Michael and the Chief, the techniques present these characters at or prior to when the viewer moved the viewport away from these characters.

This is but one example of the many ways in which the techniques enable small-screen movie-watching using a viewport. The following discussion turns to an example setting, operating embodiment, techniques that may be employed in the operating embodiment, and a device in which component(s) of the operating embodiment can be embodied. In the discussion below, reference is made to the operating embodiment by way of example only.

Example Setting and Operating Embodiment

Figure 1:
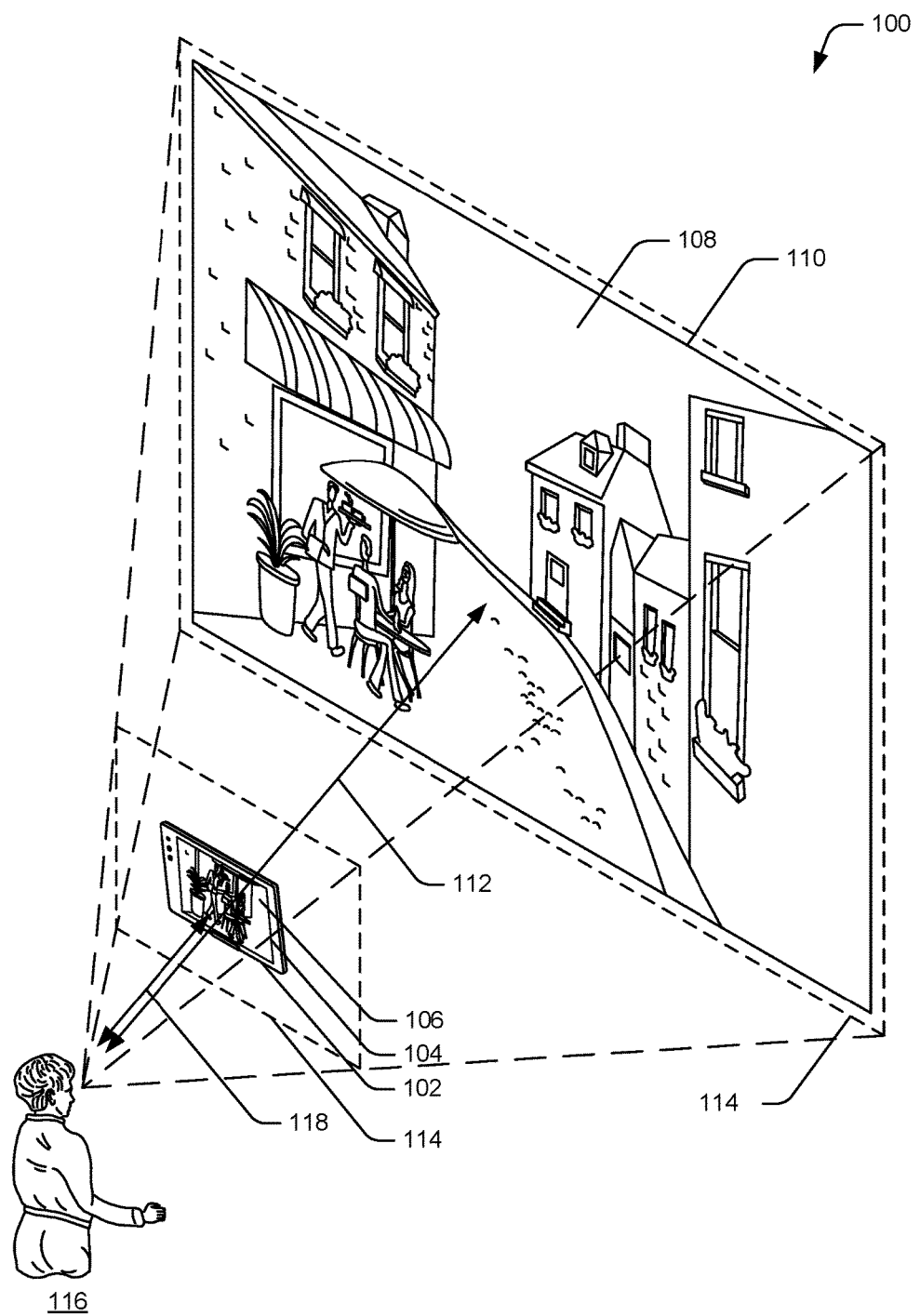
FIG. 1 illustrates an example setting in which a viewer watches a movie on a movie screen and experiences the movie through a viewport of a tablet device showing a portion of that movie.

To illustrate how a viewport shows portions of a movie relative to a size at which a movie was intended to be seen, consider example setting 100 of FIG. 1. Setting 100 includes a small-screen media-consumption device 102 (small-screen device 102) having a display 104 in which a viewport 106 presents portions of movie 108. Assume that movie 108 was intended to be watched on a movie screen 110 and at a distance 112 roughly at a center of a typically-sized movie theater. Thus, movie 108, when viewed at that size and from that distance 112, indicates a movie perspective 114 for viewer 116. The viewer's perspective affects his or her ability to see plot elements and their environment at sufficient detail to appreciate them.

Changing this distance to a small-screen distance 118 from viewer 116 to display 104 of small-screen device 102 (e.g., arm's length), shows movie perspective 114 at this small-screen distance 118. Comparing movie perspective 114 to display 104 shows that display 104 cannot present all of movie 108. Display 104 is able only to present small to moderately-sized portions of movie 108 in the detail shown on movie screen 110. The techniques, however, enable viewer 116 to view portions of movie 108 that are not currently presented by orienting viewport 106, thereby enabling both plot elements and their environment to be experienced by the viewer.

Figure 2:
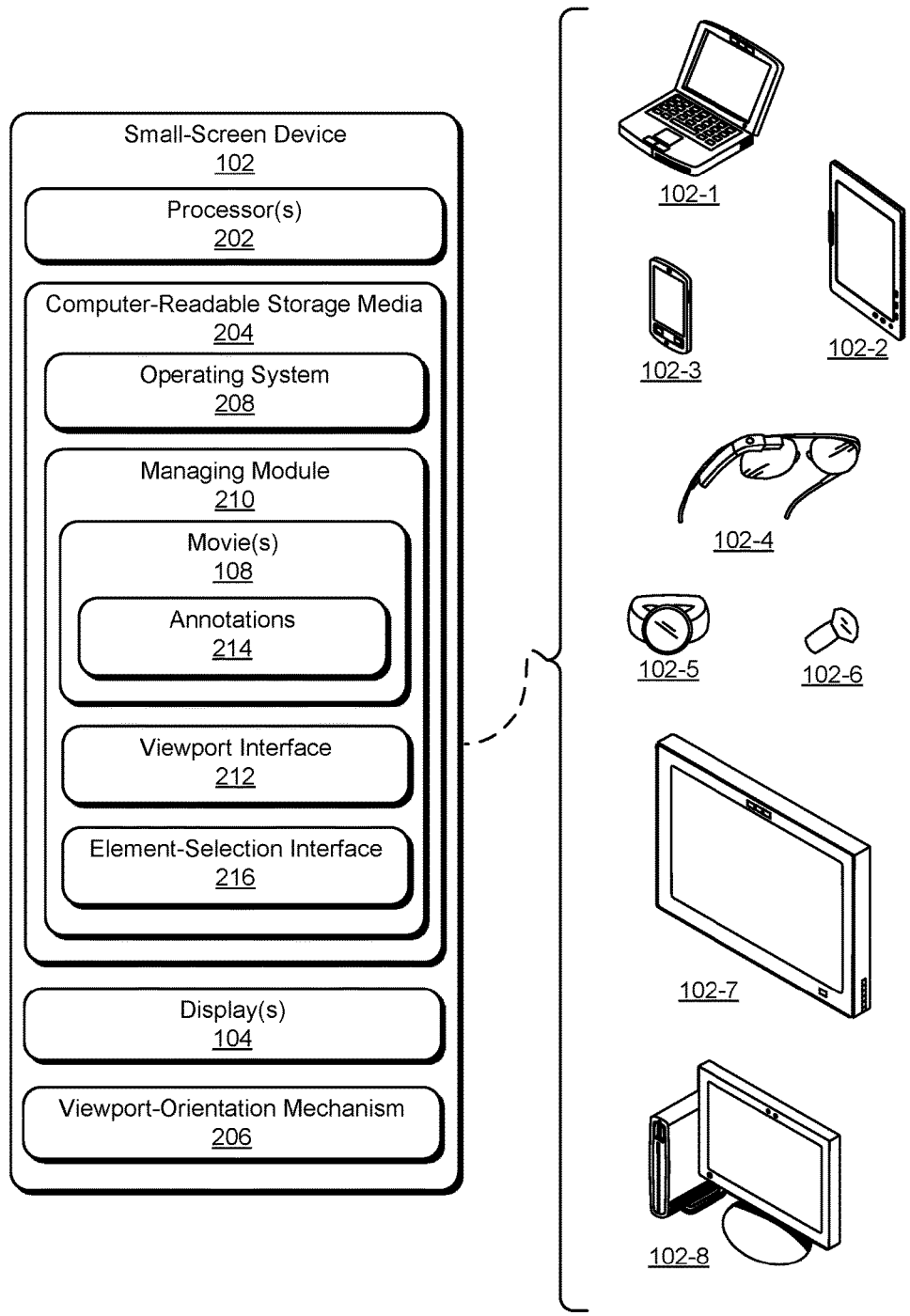
FIG. 2 illustrates an example embodiment in which techniques for small-screen movie-watching using a viewport on a small-screen media-consumption device can be implemented.

With this setting in mind, consider FIG. 2, which illustrates an example embodiment of small-screen device 102 of FIG. 1. Small-screen device 102 is illustrated with eight example devices: a laptop computer 102-1, a tablet computer 102-2, a smart phone 102-3, media-consumption eyewear 102-4, a media-consumption watch 102-5, a media-consumption ring 102-6, a television 102-7, and a desktop computer 102-8, though other media-consumption devices and systems, such as a personal media player, a digital camera, and a personal navigation device are contemplated.

Note that small-screen device 102 need not be a small device, but instead be a device having a small screen or different aspect ratio. Note also that the small screen is relative to a screen size intended for the movie, an aspect ratio intended for the movie, and/or its perspective. Thus, a television-sized screen is a small screen for a movie intended for a theatrical release in large-screen theaters (e.g., modern movie-screen sizes and IMAX), though it is not a small screen for a television program intended for a television-sized screen.

Small-screen device 102 includes or has access to computer processor(s) 202, computer-readable storage media 204 (media 204), one or more displays 104, and viewport-orientation mechanism 206. Media 204 includes an operating system 208 and managing module 210. Although not shown, media 204 may also include applications and user data, such as digital images, audio files, or documents.

Viewport-orientation mechanism 206 is capable of sensing a viewer's viewport orientations through various input manners and devices, which range from buttons, capacitive sensors, remote controls, and touch screens to orientation sensors (e.g., accelerometers, cameras, or micro-electrical-mechanical systems (MEMS)) capable of determining an orientation, or orientation change of, display 104 of small-screen device 102. Orientation sensors can determine selections that tilt, turn, push away (e.g., to zoom in), pull toward (e.g. to zoom out), move up, move left, move right, and move down display 104, to name just a few.

Orientations sensors, in some cases, include micromachined accelerometers. These micromachined accelerometers, depending on the types, are configured to measure in multiple axes magnitude and direction of proper acceleration (e.g., G-force) as a vector quantity. By so doing, the micromachined accelerometers can sense orientation, coordinate acceleration, vibration, shock, and falling. For use as orientation sensors, these micromachined accelerometers can sense six degrees of freedom of small-screen device 102, including three degrees of freedom in translation (X, Y, and Z) and three in rotation (pitch, yaw, and roll). Cameras can also or instead be used to track a device's location, such as relative to a user viewing the display, through tracking known objects (e.g., a book pictured by the camera can be used to determine, based on the book changing size or location in an image captured by the camera, an orientation or location in three dimensions of the display) or objects that relate to the viewer, such as by tracking a user's facial features (e.g., eyes, cornea, irises). Orienting a mobile display can be as intuitive as a user turning his or her head or eyes (tracked by a camera, for example) or moving a laptop up and down and side to side.

Furthermore, user's view selections received through these various input manners can be mapped to a particular desired view. For example, if a user moves a display away from herself, this movement can be sensed by an accelerometer or camera of viewport-orientation mechanism 206, and sensor data from the accelerometer or camera passed directly to managing module 210 or view processed by viewport-orientation mechanism 206 to analyze the sensor data to determine that the display is being moved away from the user. This determination can map to desired views, such as a zooming in or out of the currently viewed content. Other examples include selecting a right button or touch control, which is then sensed by (or passed to as selection data to) viewport-orientation mechanism 206, which in turn determines that display 104 has moved right relative to content being displayed. This determination can be passed to managing module 210, which then presents a different view (to the right of the prior view) of movie 108.

Managing module 210 includes or has access to a viewport interface 212 and one or more movies 108. Movie 108 is an audio-visual media program having images and audio, such as images of people, objects, and landscapes, and audio, such as the sound of wind through trees, people speaking, and a music soundtrack. Movie 108 is described as a motion picture intended for theatrical release, though made-for-television movies, television programs, and the like are included within the term "movie" as the term is used herein. Examples include I Love Lucy (1950s television), The Good, the Bad and the Ugly ("Spaghetti Western" motion picture released in 1966), The Godfather (1972 motion picture), Avatar (2009 motion picture), and M*A*S*H (1970s and 1980s television) to name a few. Each of movies 108 may include annotations 214, though these may be internal to, or separate but associated with, each movie 108. Ways in which annotations 214 can be made and used are set forth in greater detail below.

Managing module 210 is capable of presenting movie 108 through viewport interface 212, receiving viewport orientations from viewport-orientation mechanism 206, and continuing or ceasing to continue through a movie's plot based on whether or not the viewport shows a plot element that is central to the plot. As noted in part above, when viewport 106 shows characters, objects, and other elements central to the plot, managing module 210 continues the plot of movie 108. When viewport 106 shows environment for movie 108 without also showing plot elements, however, managing module 210 ceases to continue the plot.

Assume for the scene shown in FIG. 1 that the elements central to the plot are the seated characters at the outdoor café. When a viewer selects an orientation showing the waiter and the building, but not the seated couple, the plot does not continue. When the viewer orients the viewport to view the seated couple, the techniques continue the plot. By so doing, movie 108 can be presented with the plot fully appreciated by the viewer and in sufficient detail while still permitting, but not necessarily requiring, the viewer to explore the environment intended to be shown with the plot element in that scene.

In some cases, managing module 210 is also capable of determining what fraction of movie 108 to present through viewport 106. This can be determined based on screen sizes, aspect ratios, or related view perspectives for a current display (e.g., a small screen) and/or an originally intended screen size, aspect ratio, and/or related perspective (e.g., a movie screen at a movie-theater distance). Intended screen sizes and related perspectives can vary based not only on a program being a movie, but also when the movie was released. A 1940s-era movie screen is not as large as a modern IMAX, nor is a 1950s-era television show intended for a screen nearly as large as most modern home television screens. Other factors may also be used in determining a fraction of movie 108 to present through viewport 106, such as resolutions of current and intended presentations, annotations indicating sufficient detail needed, and other information described below.

Managing module 210 may also enable a user (e.g., an editor or director) to select plot elements central to the plot of movie 108, such as through element-selection interface 216, which is described below.

Methods

The following discussion describes techniques for small-screen movie-watching using a viewport. These techniques can be implemented utilizing the previously described environment, such as display 104, viewport-orientation mechanism 206, and/or managing module 210 of FIGS. 1 and/or 2. These techniques include example methods illustrated in FIGS. 3 and 5, which are shown as operations performed by one or more entities. The orders in which operations of these methods are shown and/or described are not intended to be construed as a limitation, and any number or combination of the described method operations can be combined in any order to implement a method, or an alternate method, including any of those illustrated by FIGS. 3 and 5.

Figure 3:
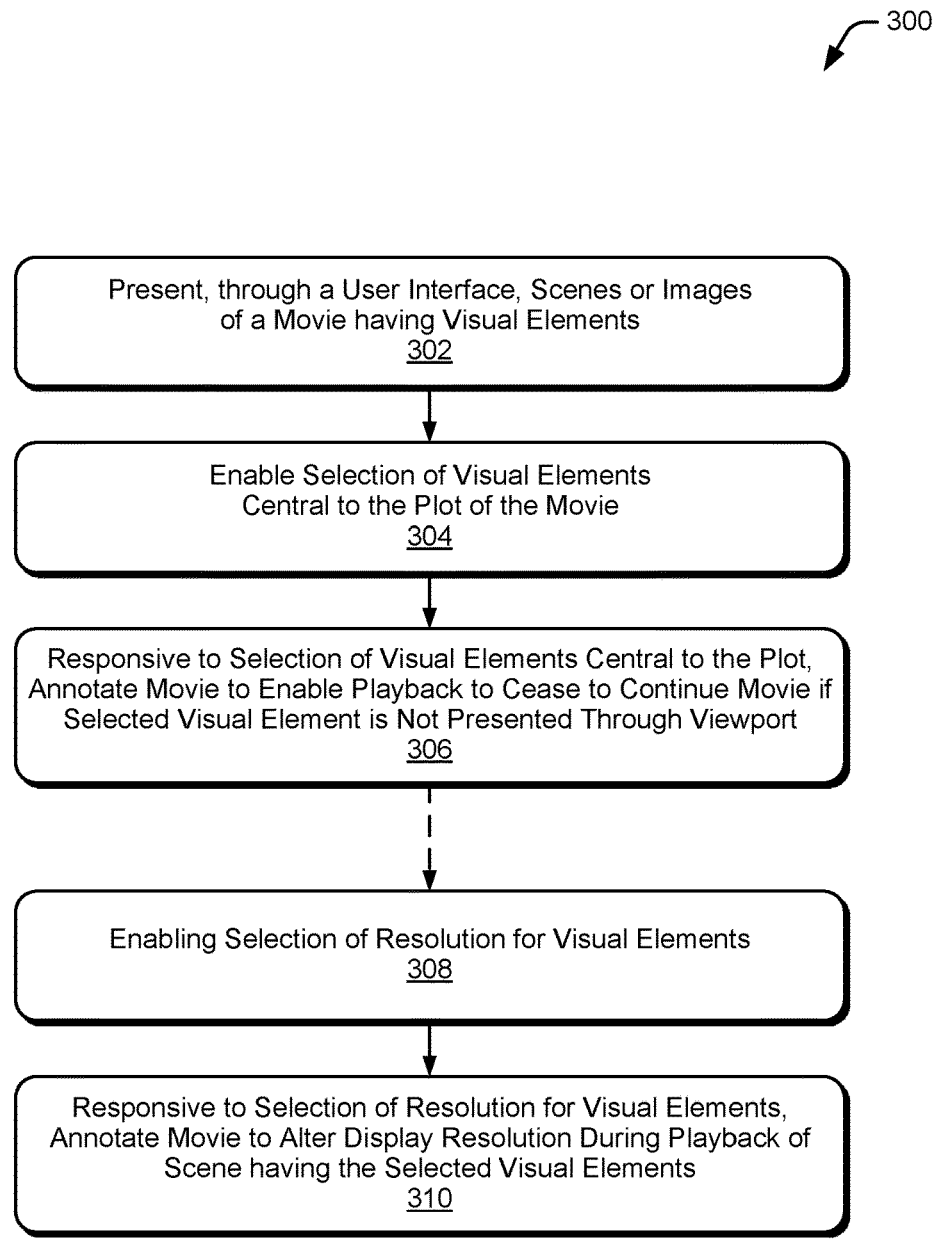
FIG. 3 illustrates example methods for annotating movies to indicate visual elements central to a plot of a movie, which can aid future presentation of the movie.

FIG. 3 illustrates example method(s) 300 for annotating movies to indicate visual elements central to a plot of a movie. By so doing, methods 300 aid future presentation (e.g., playback) of the movie through a small screen using a viewport, though they are not required for this presentation.

At 302, scenes of a movie are presented through a user interface, each of which have (or potentially have) visual elements central to a plot of the media program. Each scene can include multiple images, and while each image can be presented and visual elements selected, managing module 210 may instead present scenes having similar or identical (but usually moving) elements such that selection of visual elements of a single scene is sufficient to annotate many images within that scene.

Figure 4:
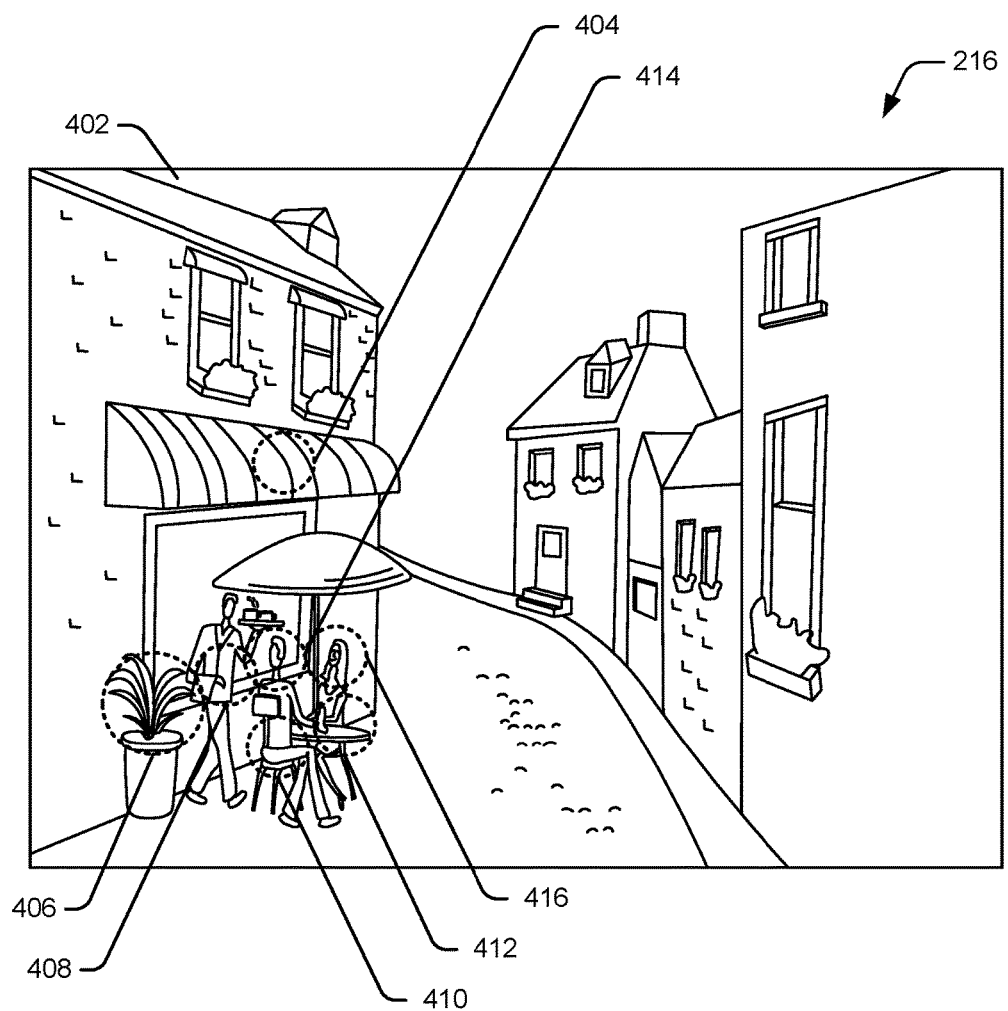
FIG. 4 illustrates an image of the movie shown in FIG. 1 along with visual elements that can be selected as an element central to the plot.

At 304, selection is enabled, through the user interface, for selecting one or more of the visual elements for each of the scenes. Consider FIG. 4, in which a scene 402 shows a couple sitting at a table in an outdoor café. Managing module 210 enables, at 302 and through element-selection interface 216, a user to select visual elements central to the plot of movie 108. Managing module 210 enables the user to select, for example, awning 404, plant 406, waiter 408, sitting man 410, sitting woman 412, or portions thereof, such as sitting man's face 414, sitting woman's face 416, and so forth. Assume here that the user selects two visual elements to be central to the plot, sitting man's face 414 and sitting woman's face 416.

At 306, the movie is annotated, responsive to selection of selected visual elements, sufficient to indicate that the selected visual elements are central to the plot of the movie. The annotations may include any suitable indicators or information, such as meta-data, extensible markup language (XML), material exchange format (MXF) data, advanced authoring (AAF) data, and the like. As noted above, these annotations 214 can aid in subsequent playback of the movie by indicating that, if viewport 106 does not include the visual elements, to cease to continue the movie's plot. Concluding the ongoing example, if, during playback of the movie during scene 402, sitting man's face 414 and sitting woman's face 416 are not show in viewport 106, managing module 210 may cease to continue the plot of movie, as detailed in methods described below.

While this example shows selection of faces and the like, a user may, such as for an action film, select a car exploding, a plane flying, or a man parachuting out of a plane but forgo many (even all) characters shown in a scene. Also, while not required, methods 300 may enable selection for audio of the movie to be considered central to the plot. If audio is selected as central to the plot but no visual elements are also central in the same scene (and thus only environment is shown), playback may continue independent of what is shown in the viewport. If audio is considered central for a scene and visual elements are also considered central to the plot, annotations may indicate to not play the audio when viewing the environment, as that may make viewing the environment disjointed or give away a plot element best enjoyed with the corresponding visuals. Thus, in The Godfather scene noted above, playing the audio of the gunshot without showing Michael Corleone shooting the gun, may be prevented.

Subsequent playback may potentially cease to continue the plot if the audio is indicated as not having been heard by the viewer, however. An editor may determine, for example, that dialog is important but not what is shown, such as in some dramas or when a movie has a narrator.

Scenes, or images within a scene, can forgo having selected visual elements. The user may forgo annotating visual elements in a scene because there are no visual elements central to a movie's plot. Examples include scenes or images panning an area, providing general background for the plot, and so forth. If no visual elements are indicated as central to the plot, managing module 210 may continue to present a movie's plot regardless of what portion of that scene is shown in a viewport.

Alternatively or additionally, methods 300 may proceed to 308 and 310. At 308, selection of a resolution for each of the scenes is enabled. In many cases sufficient detail is assumed for a particular element based on a size at which the viewport is set to present portions of the movie. In some cases, however, a resolution may also be selected, thereby potentially altering a fraction of a movie shown through a viewport. This resolution can increase or decrease the fraction. An editor or other user, for example, may indicate that while the couple shown in scene 402 are elements central to the plot, that the resolution needed is not very high (e.g., where audio dialog is important but facial expressions are not).

In contrast, the editor may indicate that various elements need a high resolution, such as showing minute detail of a crime scene needed for a viewer to fully follow the plot, in which case the fraction may be decreased (and thus detail increased). Note that these viewport alterations may also vary depending on a display aspect ratio (4:3, 16:9, or 2.39:1,) display resolution (e.g., HDTV 1080p or 720p, lower-resolutions CGA, SVGA, or WVGA, or pixel density), and thus either not alter or alter the fraction based on the resolution of the display.

At 310, responsive to selection of the resolution, the media program is annotated with the resolution. This resolution enables subsequent playback of the media program to alter a fraction size of a viewport based on a desired resolution for the scene.

Figure 5:
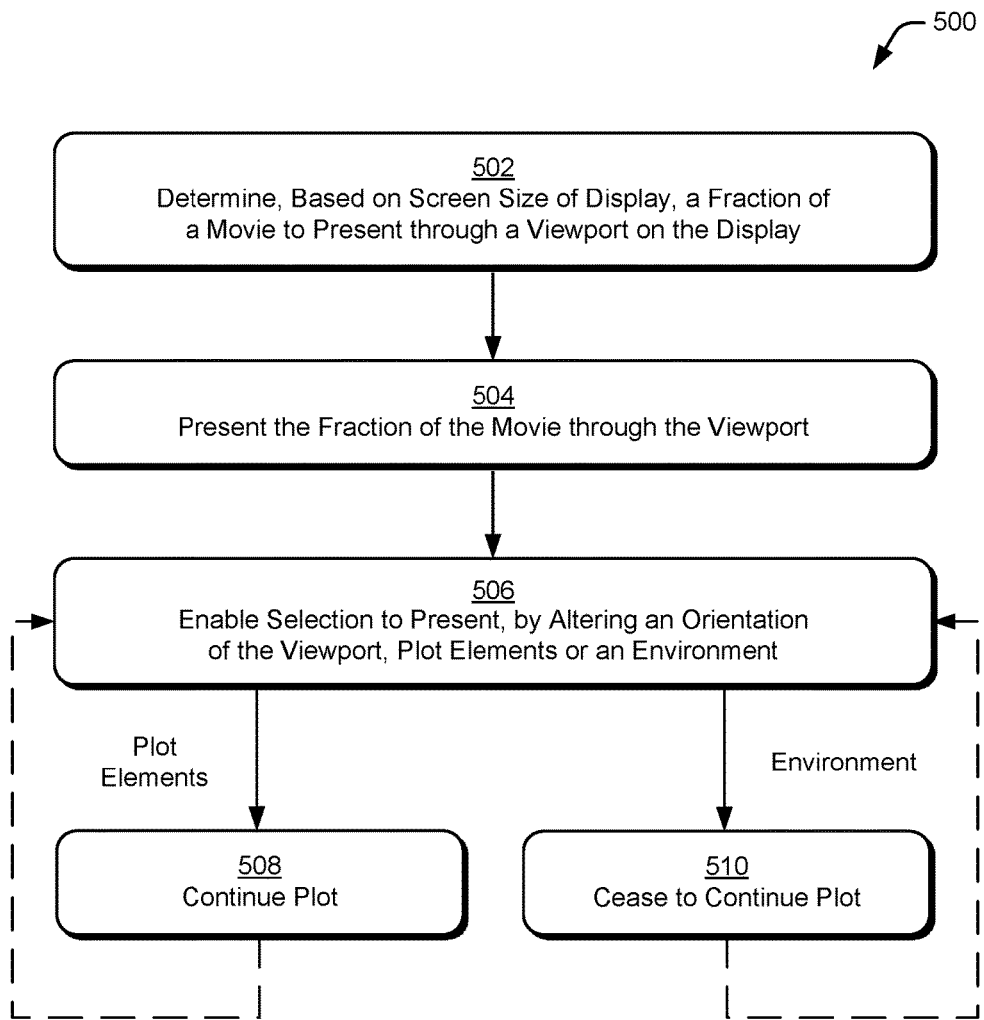
FIG. 5 illustrates example methods for small-screen movie-watching using a viewport.

FIG. 5 illustrates example method(s) 500 for small-screen movie-watching using a viewport. These methods enable viewers to watch movies and other media programs using a small screen as a viewport to the movie rather than dramatically compress or crop the movie to fit the small screen. Annotations, such as those described above, may, but do not have to be used, for methods 500 to operate.

At 502, a fraction of a media program to present through a viewport on a display is determined. This determination is based on a screen size of the display on which the media program is or is intended to be presented, as noted in part above. This determination may also be based on view perspectives of the small screen or the intended large screen, as noted above, as well as an image resolution of the movie and/or a display resolution of the display. Thus, a low resolution television program from the 1940s may not have a high enough resolution to show much detail for an actor's facial expressions. In such a case the fraction shown in the viewport may be higher, as the size and resolution of the small screen captures all of the resolution that the television program could show even at its intended size.

Figure 6:
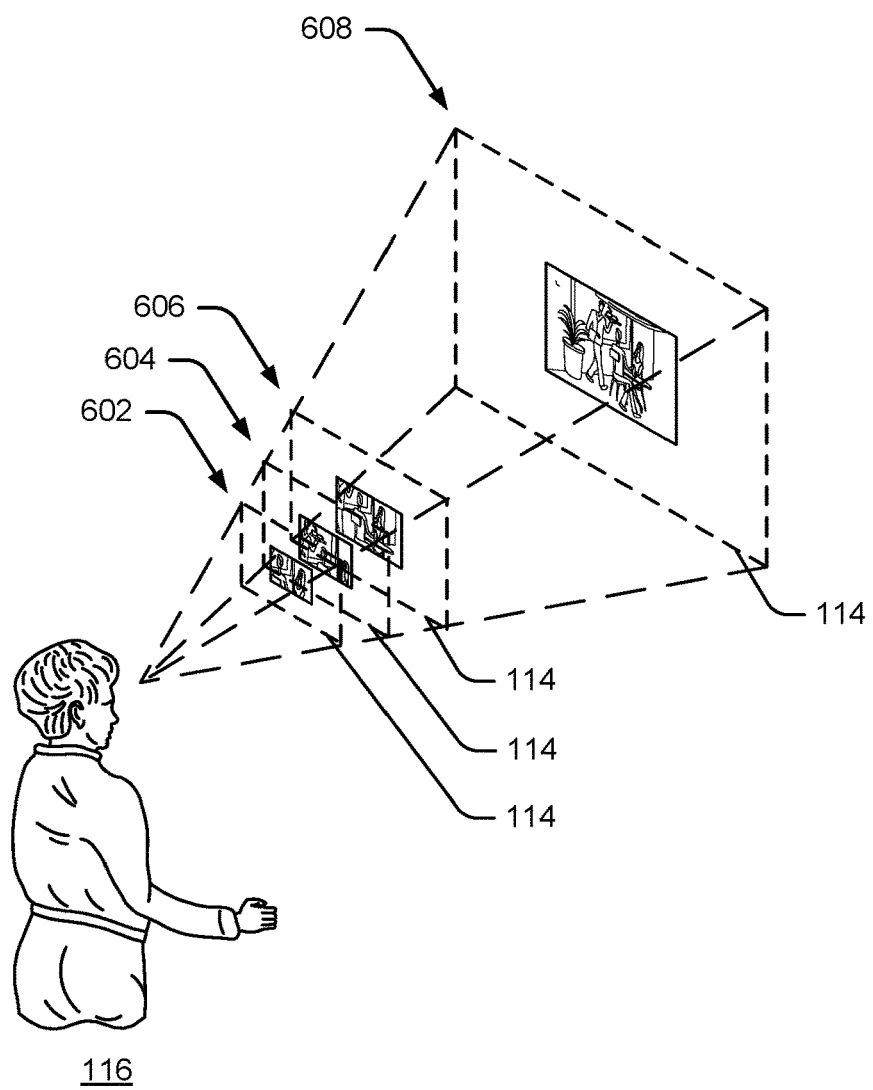
FIG. 6 illustrates perspectives associated with small-screen displays of different sizes and at different distances from a viewer.

Consider, by way of example, FIG. 6, which further illustrates movie perspective 114 of FIG. 1 from distances associated with different small-screen displays of different sizes, all from the point of view of viewer 116. The first is at a distance less than arm's length of viewer 116 for a smart-phone-sized display, close perspective 602. The second is at a distance about or slightly less than an arm's length for a tablet-sized display, moderately-close perspective 604. The third is at a distance of a desktop or laptop computer, which is generally at or further than arm's length, that of the moderate perspective 606. The fourth is at a distance of a television or gaming display, moderately-far perspective 608.

Figure 7:
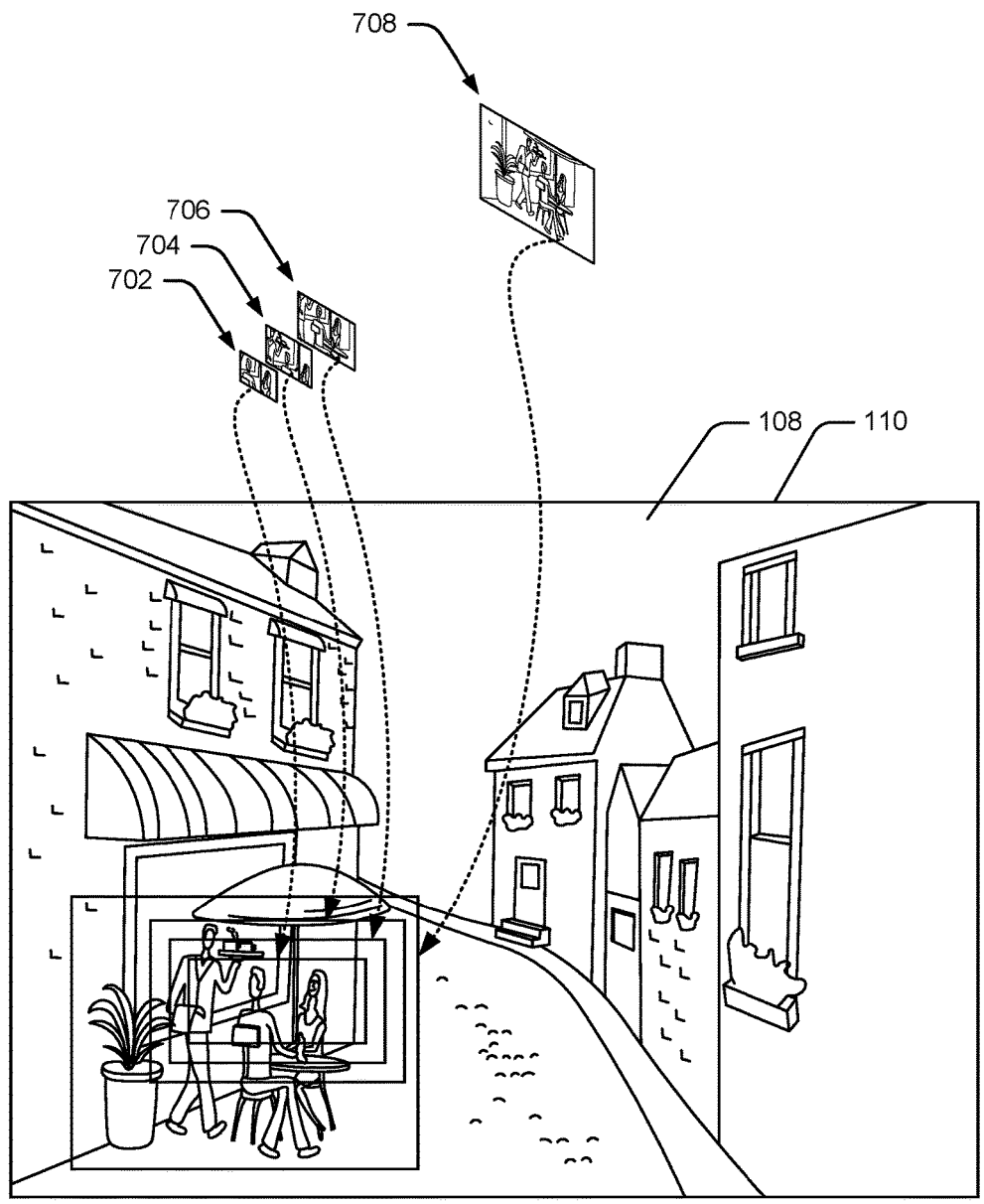
FIG. 7 illustrates viewports corresponding to perspectives shown in FIG. 6.

Respective viewports 702, 704, 706, and 708 are shown for each of these perspectives 602, 604, 606, and 608 in FIG. 7. Even though each of these viewports are, at these distances, insufficient to provide the environment and detail of movie 108 presented by movie screen 110, the techniques enable presentation of elements central to the plot (the faces of the man and woman) while also enabling selection to view the environment surrounding these elements (the waiter, house, plant, buildings). Note that, due to distances for these viewports, some viewports may have a smaller fraction than a viewport on a smaller screen. Viewport 706, while on a larger, desktop-sized screen, has a smaller fraction than viewport 704, which is on a smaller, tablet-sized screen.

Furthermore, in some cases the fraction may change as the movie is presented, such as in cases where annotations (e.g., annotations 214 of FIG. 2 selected through methods 300) associated with the movie indicate that low or high resolution (and thus fraction of the movie) is or is not desired. In such a case manager module 210 may zoom in or out to show a lower or higher fraction, respectively, though a process showing the zooming may not be apparent to the viewer.

At 504, the fraction of the movie is presented through the viewport on the display. The fraction of the movie presented may include plot elements of a scene or the environment surrounding the plot elements to provide context for the ongoing plot. Examples of these fractions for various small screens are shown in FIGS. 1, 6, and 7.

At 506, selection is enabled to present, by altering an orientation of the viewport, plot elements central to a plot of the media program or an environment of the plot elements. As noted above, plot elements can be previously selected, such as by an editor using methods 300 above, or through other manners. Thus, plot elements can be determined previous to presenting the movie or even during its presentation, such as through use of object recognition algorithms, facial recognition systems, and so forth. Manager module 210, for example, may determine through facial recognition four faces in a scene and, in conjunction with audio dialog of that scene, associate two of the faces with the dialog. In so doing, manager module 210 may assign the two faces in the scene with dialog to be plot elements central to the plot of the movie.

Figure 8:
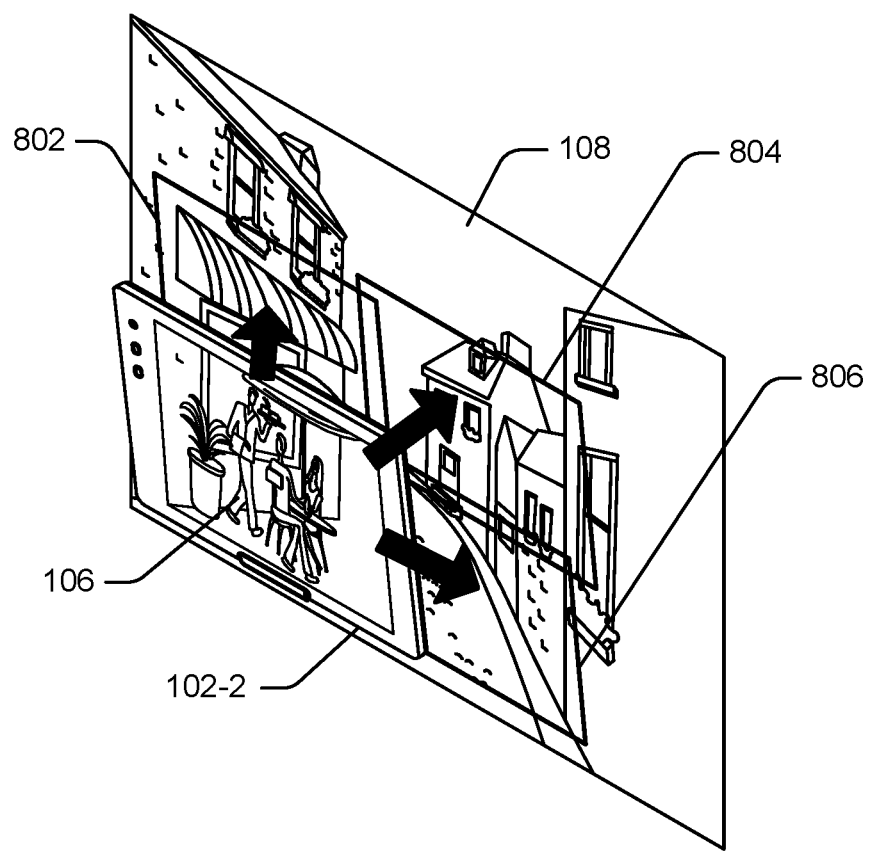
FIG. 8 illustrates example viewport selections of plot elements and/or an environment in which the plot elements are presented.

With plot elements determined, selection of the plot elements or an environment of the plot elements is enabled. Consider, by way of example, FIG. 8, which further illustrates movie 108 of FIG. 1 with different selections of plot elements and environment in which the plot elements are shown. In the current selection, viewport 106 includes the plot elements of movie 108, namely the faces of the seated couple. Orienting tablet computer 102-2 enables the viewer to select the environment of movie 108 without the seated couple, such as viewport 802 above the seated couple, viewport 804 above-right of the seated couple, or viewport 806 to the right of the seated couple. In each of these cases managing module 210 ceases to continue to present the plot, in this example, by looping a segment of the scene such that on returning to view the couple, the conversation and expressions of the couple are not missed by the viewer.

At 508, when the selections present the plot elements, the plot elements are presented effective to continue the plot of the media program. At 510, when the selections present the environment but not the plot elements, the plot elements of the media program are ceased. Ceasing to continue the plot of the media program may pause or repeat the plot elements until the viewport includes the plot elements. Note that when the selections present the environment and the plot elements are repeated, a scene in the media program or a subset of the scene can be looped effective to present moving images of the environment.

When the selections to present the plot elements follow immediately after presenting moving images of the environment, the scene or the subset of the scene having the plot elements can be repeated prior to continuing the plot of the media program. In so doing, a seamless move from plot elements to environment and back again is permitted, all without losing the plot elements and thus the ability of a viewer to follow the plot.

In some cases, managing module 210 may indicate to the viewer whether or not a current viewport is or is not continuing the plot, showing plot elements, or showing only environment by presenting a visual indicator in the view. Examples include items that are noticeable but unobtrusive, such as an insect or small item placed in the scenes near the plot elements, semi-opaque icon, and so forth. More-obvious indicators can also be used, such as reduced resolution when showing environment, zooming out or zooming in response to viewports showing only environment, a flashing light, and so forth. When the last element central to the plot is presented, managing module 210 may end the movie.

Example Device

Figure 9:
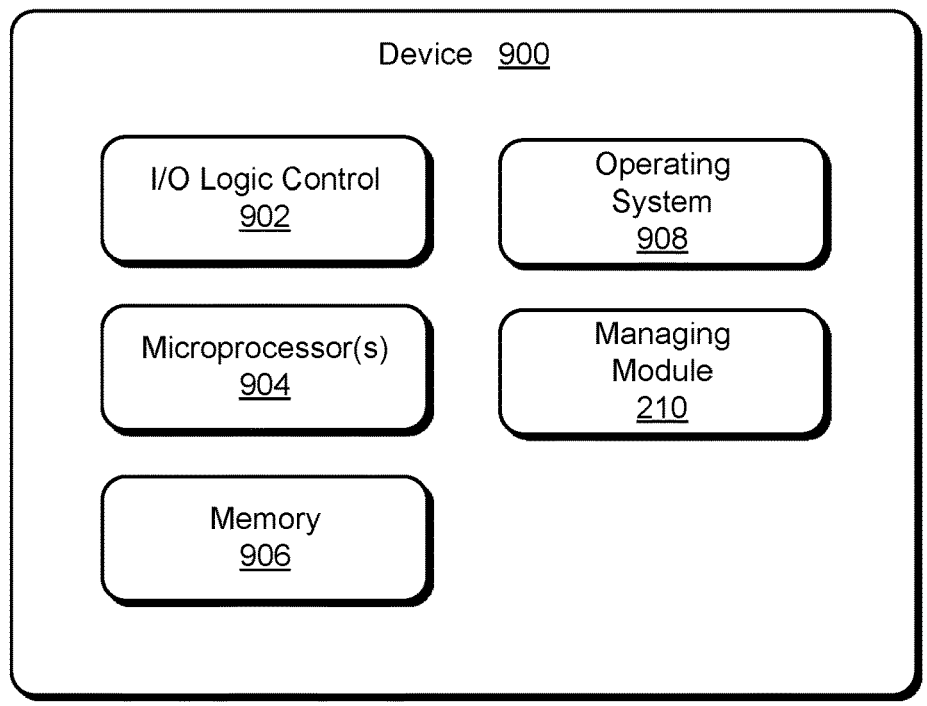
FIG. 9 illustrates a device having various components capable of implementing techniques of small-screen movie-watching using a viewport.

FIG. 9 illustrates various components of an example device 900 including managing module 210 that includes or has access to other modules, such as viewport interface 212 and viewport-orientation mechanism 206. These components can be implemented in hardware, firmware, software, or any suitable combination thereof and/or implemented as described with reference to any of the previous FIGS. 1-8.

Example device 900 can be implemented in a fixed or mobile device being one or a combination of a media device, computing device (e.g., small-screen device 102 of FIG. 1), video processing and/or rendering device, appliance device (e.g., a closed-and-sealed computing resource, such as some digital video recorders or global-positioning-satellite devices), gaming device, electronic device, vehicle, and/or workstation, so long as each is associated with a mobile display.

Example device 900 can be integrated with electronic circuitry, a microprocessor, memory, input-output (I/O) logic control, communication interfaces and components, other hardware, firmware, and/or software needed to run an entire device. Example device 900 can also include an integrated data bus (not shown) that couples the various components of the computing device for data communication between the components.

Example device 900 includes various components such as an input-output (I/O) logic control 902 (e.g., to include electronic circuitry) and microprocessor(s) 904 (e.g., microcontroller or digital signal processor). Example device 900 also includes a memory 906, which can be any type of random access memory (RAM), a low-latency nonvolatile memory (e.g., flash memory), read only memory (ROM), and/or other suitable electronic data storage.

Example device 900 can also include various firmware and/or software, such as an operating system 908, which can be computer-executable instructions maintained by memory 906 and executed by microprocessor 904. Example device 900 can also include other various communication interfaces and components, wireless LAN (WLAN) or wireless PAN (WPAN) components, other hardware, firmware, and/or software.

Other examples capabilities and functions of these components are described with reference to elements shown in FIGS. 1 and 2, along with illustrations of FIGS. 3-8. These components, either independently or in combination with modules or entities described herein, can be implemented as computer-executable instructions maintained by memory 906 and executed by microprocessor 904 to implement various embodiments and/or features described herein. These components may also be provided integral with other components of device 900, such as integrated with managing module 210.

Alternatively or additionally, any or all of these components can be implemented as hardware, firmware, fixed logic circuitry, or any combination thereof that is implemented in connection with the I/O logic control 902 and/or other signal processing and control circuits of example device 900. Furthermore, some of these components may act separate from device 900, such as a remote (e.g., cloud-based) component performing services for managing module 210.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A small-screen media-consumption device comprising:
a display;
a viewport-orientation mechanism;
one or more computer processors; and
computer-readable storage media, the computer-readable storage media having instructions thereon that, in response to execution by the one or more computer processors, performs operations comprising:
determining, based on a screen size of the display and on an intended distance from an intended screen to a viewer of a movie, a fraction of the movie to present through a viewport on the display, the fraction representing a portion of an image size of images of the movie;
presenting the fraction of the movie through the viewport on the display;
receiving viewport orientations from the viewport-orientation mechanism, the viewport orientations selecting presentation, through the viewport, of plot elements central to a plot of the movie or an environment of the plot elements; and
when the selections present the plot elements, continuing the plot of the movie and when the selections present the environment:
ceasing to continue the plot of the movie; or
repeating the plot of the movie until the viewport orientations select presentation of the plot elements, and, on selection of the plot elements, repeating presentation of the plot elements not previously viewed through the viewport.

2. The small-screen media-consumption device as recited in claim 1, wherein the viewport orientations received through the viewport-orientation mechanism includes tilting, turning, pushing away, pulling toward, moving up, moving left, moving right, or moving down the display.

3. The small-screen media-consumption device as recited in claim 1, wherein ceasing to continue the plot of the movie pauses the plot elements until the viewport includes at least one of the plot elements.

4. The small-screen media-consumption device as recited in claim 1, wherein repeating the plot of the movie repeats the plot elements until the viewport includes at least one of the plot elements.

5. The small-screen media-consumption device as recited in claim 1, wherein when the selections present the environment, a scene in the movie or a subset of the scene is looped effective to present moving images of the environment.

6. The small-screen media-consumption device as recited in claim 5, wherein when the selections to present the plot elements follow immediately after presenting moving images of the environment, the scene or the subset of the scene having the plot elements is repeated prior to continuing the plot of the movie.

7. The small-screen media-consumption device as recited in claim 1, wherein determining the fraction of the movie to present through the viewport is further based on an intended aspect ratio for the movie.

8. The small-screen media-consumption device as recited in claim 7, wherein the movie is a theatrically released motion picture, and the intended screen size is a theater screen size of an era in which the movie was released or the intended aspect ratio is a theater aspect ratio of the era in which the movie was released.

9. The small-screen media-consumption device as recited in claim 7, wherein the movie is a television program, and the intended screen size is a television screen size of an era in which television program was released or the intended aspect ratio is a television aspect ratio of the era in which the television program was released.

10. The small-screen media-consumption device as recited in claim 1, wherein determining the fraction of the movie to present through the viewport based on the intended distance from the intended screen to the viewer of the movie is based on the intended distance being a movie-theater distance and the intended screen being a movie screen.

11. The small-screen media-consumption device as recited in claim 1, wherein determining the fraction of the movie to present through the viewport is further based on an image resolution of the movie and a display resolution of the display.

12. The small-screen media-consumption device as recited in claim 1, further comprising, when presenting the environment without presenting one of the plot elements in a same scene as the environment, ceasing to present audio previously indicated as an audio element central to the plot.

13. One or more computer-readable storage devices comprising processor-executable instructions that, responsive to execution by one or more processors, perform a method comprising:
   presenting, through a user interface, scenes of a movie, each of the scenes having visual elements that are potentially central to a plot of the movie;
   enabling selection, through the user interface, of one or more of the visual elements to provide selected visual elements; and
   responsive to selection of the selected visual elements, annotating the movie sufficient to indicate that the selected visual elements are central to the plot of the movie, the annotating enabling subsequent playback of the movie to cease to continue the plot responsive to the selected visual elements not being presented through a viewport in which the movie is presented or to return to the plot responsive to the selected visual elements later being presented through the viewport.

14. The computer-readable storage devices as recited in claim 13, wherein the movie is a theatrically released motion picture or a television program.

15. The computer-readable storage devices as recited in claim 13, further comprising:
   enabling selection of one or more audio elements to provide selected audio elements; and
   responsive to selection of the selected audio elements, annotating the movie sufficient to indicate that the selected audio elements are central to the plot of the movie.

16. The computer-readable storage devices as recited in claim 13, further comprising:
   enabling selection of a resolution for one of the scenes; and
   responsive to selection of the resolution, annotating the movie with the resolution, the annotating with the resolution usable to determine a fraction of the movie to be shown in the viewport.

17. The computer-readable storage devices as recited in claim 13, further comprising:
   enabling selection of a fraction to be shown in the viewport for one of the scenes and for a size of the viewport; and
   responsive to selection of the fraction, annotating the movie with the fraction, the annotating with the fraction usable to determine a portion of the movie to be shown in the viewport having the size.

18. The computer-readable storage devices as recited in claim 13, further comprising selecting other visual elements using an object recognition algorithm and wherein annotating the movie annotates the selected other visual elements.

19. The computer-readable storage devices as recited in claim 13, further comprising selecting other visual elements using a facial recognition system and wherein annotating the movie annotates the selected other visual elements.

20. The computer-readable storage devices as recited in claim 19, wherein selecting the other visual elements using the facial recognition system is based on audio dialog of actors associated with one or more faces found using the facial recognition system.

* * * * *

UNITED STATES PATENT AND TRADEMARK OFFICE
CERTIFICATE OF CORRECTION

PATENT NO. : 10,056,114 B2
APPLICATION NO. : 15/449931
DATED : August 21, 2018
INVENTOR(S) : Darren Mark Austin et al.

It is certified that error appears in the above-identified patent and that said Letters Patent is hereby corrected as shown below:

On the Title Page

After "Assignee" before "Mountain View" delete "Colby Nipper" and Insert --Google LLC--

Signed and Sealed this
Thirteenth Day of December, 2022

Katherine Kelly Vidal
*Director of the United States Patent and Trademark Office*